US012704841B2

(12) United States Patent
Faust et al.

(10) Patent No.: US 12,704,841 B2
(45) Date of Patent: Aug. 11, 2026

(54) DEEP REINFORCEMENT LEARNING-BASED TECHNIQUES FOR END TO END ROBOT NAVIGATION

(71) Applicant: Google LLC, Mountain View, CA (US)

(72) Inventors: Aleksandra Faust, Palo Alto, CA (US); Hao-tien Chiang, Mountain View, CA (US); Anthony Francis, Mountain View, CA (US); Marek Fiser, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1361 days.

(21) Appl. No.: 17/275,459

(22) PCT Filed: Sep. 13, 2019

(86) PCT No.: PCT/US2019/051065
§ 371 (c)(1),
(2) Date: Mar. 11, 2021

(87) PCT Pub. No.: WO2020/056299
PCT Pub. Date: Mar. 19, 2020

(65) Prior Publication Data

US 2021/0325894 A1 Oct. 21, 2021

Related U.S. Application Data

(60) Provisional application No. 62/731,788, filed on Sep. 14, 2018.

(51) Int. Cl.
*G05D 1/00* (2024.01)
*G06N 3/045* (2023.01)
*G06N 3/08* (2023.01)

(52) U.S. Cl.
CPC .......... *G05D 1/0221* (2013.01); *G06N 3/045* (2023.01); *G06N 3/08* (2013.01)

(58) Field of Classification Search
CPC ........ G05D 1/0221; G06N 3/045; G06N 3/08; G06N 3/008
See application file for complete search history.

(56) References Cited

U.S. PATENT DOCUMENTS

| | | | | |
|---|---|---|---|---|
| 2006/0184465 A1* | 8/2006 | Tsujino | G06N 3/08 706/15 |
| 2018/0165603 A1* | 6/2018 | Van Seijen | G06N 3/045 |
| 2018/0218502 A1* | 8/2018 | Golden | G06T 7/11 |

(Continued)

OTHER PUBLICATIONS

Singh, Satinder, et al. "Intrinsically motivated reinforcement learning: An evolutionary perspective." IEEE Transactions on Autonomous Mental Development 2.2 (2010): 70-82. (Year: 2010).*

(Continued)

*Primary Examiner* — Henry Nguyen
(74) *Attorney, Agent, or Firm* — Gray Ice Higdon

(57) ABSTRACT

Using reinforcement learning to train a policy network that can be utilized, for example, by a robot in performing robot navigation and/or other robotic tasks. Various implementations relate to techniques for automatically learning a reward function for training of a policy network through reinforcement learning, and automatically learning a neural network architecture for the policy network.

20 Claims, 9 Drawing Sheets

(56) References Cited

U.S. PATENT DOCUMENTS

| | | | | |
|---|---|---|---|---|
| 2018/0260692 | A1* | 9/2018 | Nagaraja | G06N 3/045 |
| 2018/0271015 | A1* | 9/2018 | Redden | G06N 3/08 |
| 2019/0042761 | A1* | 2/2019 | Wang | G06N 3/08 |
| 2019/0051056 | A1* | 2/2019 | Chiu | G06F 16/903 |
| 2019/0272465 | A1* | 9/2019 | Kimura | G06N 3/006 |
| 2020/0023520 | A1* | 1/2020 | Yoshizumi | B25J 9/1687 |
| 2020/0062262 | A1* | 2/2020 | Kusari | G08G 1/163 |
| 2020/0073726 | A1* | 3/2020 | Lee | G06N 3/084 |
| 2020/0151562 | A1* | 5/2020 | Pietquin | G06N 3/092 |
| 2021/0042584 | A1* | 2/2021 | Higa | G06F 18/214 |

OTHER PUBLICATIONS

Mao, Hangyu, et al. "Accnet: Actor-coordinator-critic net for"learning-to-communicate" with deep multi-agent reinforcement learning." arXiv preprint arXiv:1706.03235 (2017). (Year: 2017).*

Li CG, Wang M, Yuan QN. A multi-agent reinforcement learning using actor-critic methods. In2008 International Conference on Machine Learning and Cybernetics Jul. 12, 2008 (vol. 2, pp. 878-882). IEEE. (Year: 2008).*

European Patent Office; Communication pursuant to Article 94(3) EPC issued in Application No. 19779276.5; 14 pages; dated Sep. 29, 2023.

European Patent Office, Intention to Grant issued in Application No. 19779276.5; 39 pages; dated Feb. 28, 2024.

Singh, S. et al., "Intrinsically Motivated Reinforcement Learning: An Evolutionary Perspective;" IEEE Transactions on Autonomous Mental Development, vol. 2, No. 2, pp. 70-82, Jun. 1, 2010.

Liu, G. et al., "Learning End-to-End Multimodal Sensor Policies for Autonomous Navigation;" arXiv.org; Cornell University; arXiv:1705.10422v2; 13 pages; May 30, 2017.

Elfwing, S et al., "Co-evolution of Shaping Rewards and Meta-Parameters in Reinforcement Learning;" Adaptive Behavior, vol. 16, No. 6, pp. 400-412; Dec. 1, 2008.

Khatib, O. (1986). "Real-Time Obstacle Avoidance for Manipulators and Mobile Robots." The International Journal of Robotics Research, 5(1), 90-98; 1986.

Lillicrap, T. et al., "Continuous Control With Deep Reinforcement Learning;" Cornell University, arXiv.org, arXiv:1509.02971v2; 14 pages; Nov. 18, 2015.

Marder-Eppstein, Eitan, et al. "The office marathon: Robust navigation in an indoor office environment." Robotics and Automation (ICRA), 2010 IEEE International Conference on. IEEE, 8 pages; 2010.

Mnih et al. "Human-Level Control Through Deep Reinforcement Learning." Nature 518, No. 7540 (2015): 529-533 2015.

Sutton, R. S., et al.; Reinforcement Learning: An Introduction; MIT Press; 10 Pages; US; dated 1998.

Altuntas, N. et al.; "Reinforcement learning-based mobile robot navigation;" Turkish Journal of Electrical Engineering & Computer Sciences, 24; pp. 1747-1767; 2016.

Antonelo, E. et al.; "On Learning Navigation Behaviors for Small Mobile Robots with Reservoir Computing Architectures;" IEEE Transactions on Neural Networks and Learning Systems, vol. 26, No. 4; pp. 763-780; Apr. 2015.

Bellemare, M. et al.; "Unifying count-based exploration and intrinsic motivation;" In Proceedings of the 30th International Conference on Neural Information Processing Systems; 9 pages; Dec. 2016.

Bischoff, B. et al., "Hierarchical Reinforcement Learning for Robot Navigation;" In Proceedings of European Symposium on Artificial Neural Networks; 6 pages; Apr. 2013.

Cadena, C. et al.; "Past, Present, and Future of Simultaneous Localization and Mapping: Toward the Robust-Perception Age;" IEEE Transactions on Robotics, vol. 32 No. 6; pp. 1309-1332; Dec. 2016.

Chen, C. et al., "DeepDriving: Learning Affordance for Direct Perception in Autonomous Driving;" In Proceedings of EEE International Conference on Computer Vision; pp. 2722-2730; 2015.

Chiang, H-T. et al.; "Path-Guided Artificial Potential Fields with Stochastic Reachable Sets for Motion Planning in Highly Dynamic Environments;" IEEE International Conference on Robotics and Automation (ICRA); pp. 2347-2354; May 2015.

Chiang, H-T. et al.; Safety, Challenges, and Performance of Motion Planners in Dynamic Environments; In Proceedings of International Symposium of Robotics Research; 16 pages; 2017.

Fathinezhad, F. et al., "Supervised Fuzzy Reinforcement Learning for Robot Navigation;" Applied Soft Computing, 17 pages, 2016.

Faust, A. et al.; Avoiding Moving Obstacles with Stochastic Hybrid Dynamics using PEARL: PrEference Appraisal Reinforcement Learning; IEEE International Conference on Robotics and Automation (ICRA); pp. 484-490; May 2016.

Faust, A. et al., "PRM-RL: Long-range Robotic Navigation Tasks by Combining Reinforcement Learning and Sampling-based Planning;" In Proceedings of IEEE International Conference on Robotic and Automation (ICRA); 9 pages; 2018.

Fox, D. et al.; "The Dynamic Window Approach to Collision Avoidance;" IEEE Robotics Automation Magazine, 4(1); pp. 23-33; Mar. 1997.

Golovin, D. et al., "Google Vizier: A Service for Black-Box Optimization;" In Proceedings of ACM International Conference on Knowledge Discovery and Data Mining; pp. 1487-1495; Aug. 2017.

Graves, A. et al., "Automated Curriculum Learning for Neural Networks;" In International Conference on Machine eaming; 10 pages; 2017.

Grzes, M. et al., "Multigrid Reinforcement Learning with Reward Shaping;" In Proceedings of International Conference on Artificial Neural Networks; pp. 357-366; Sep. 2008.

Guimarȧes, R.L. et al., "ROS Navigation: Concepts and Tutorial;" Springer; Studies in Computational Intelligence 625, Robot Operating System (ROS) The Complete Reference (vol. 1); pp. 121-160; 2016.

Hansen, N. et al.; "On the Adaptation of Arbitrary Normal Mutation Distributions in Evolution Strategies: The Generating Set Adaptation;" In Proceedings of the International Conference on Genetic Algorithms; pp. 57-64; 1995.

Helbing, D. et al.; "Social Force Model for Pedestrian Dynamics;" Physical Review E, 51(5); 5 pages; May 1995.

Judah, K. et al.; "Imitation Learning with Demonstrations and Shaping Rewards;" In Proceedings of 28th AAAI Conference on Artificial Intelligence; pp. 1890-1896, 2014.

Kavraki, L. et al., "Probabilistic Roadmaps for Path Planning in High-Dimensional Configuration Spaces;" IEEE Transactions on Robotics and Automation, vol. 12, No. 4; pp. 566-580; Aug. 4, 1996.

LaValle, S. et al. "Randomized Kinodynamic Planning;" The International Journal of Robotics Research, vol. 20, No. 5; pp. 378-400; May 2001.

Lu, D. et al.; "Layered Costmaps for Context-Sensitive Navigation;" In 2014 IEEE/RSJ International Conference on Intelligent Robots and Systems; pp. 709-715; Sep. 2014.

Wise, et al.; "Fetch & Freight: Standard Platforms for Service Robot Applications;" In Workshop on Autonomous Mobile Service Robots held at the 2016 International Joint Conference on Artificial Intelligence; 6 pages; 2016.

Mousavian, A; et al., "Visual Representations for Semantic Target Driven Navigation;" In ECCV Workshop on Visual Learning and Embodied Agents in Simulation Environments; 7 pages; 2018.

Olsen, M. et al., "Robust Artificial Life via Artificial Programmed Death;" Artificial Intelligence, 172; pp. 884-898; 2008.

Reif, J et al.; "Social Potential Fields: A Distributed Behavioral Control For Autonomous Robots;" Robotics and Autonomous Systems, 27; pp. 171-194; 1999.

Su, P. et al.; "Reward Shaping with Recurrent Neural Networks for Speeding up On-Line Policy Learning in Spoken Dialogue Systems;" In Proceedings of Special Interest Group on Discourse and Dialogue; pp. 417-421; Sep. 2015.

Tamar, A. et al., "Value Iteration Networks;" In Proceedings of Neural Information Processing Systems; 9 pages; 2016.

Zheng, K.; "ROS Navigation Tuning Guide;" Cornell University, arXiv.org, arXiv:1706.09068v1; 19 pages; Jun. 27, 2017.

(56) References Cited

OTHER PUBLICATIONS

Vecerik, M. et al.; Leveraging Demonstrations for Deep Reinforcement Learning on Robotics Problems with Sparse Rewards; 10 pages; dated Jul. 27, 2017.
Vecerik, M. et al.; Leveraging Demonstrations for Deep Reinforcement Learning on Robotics Problems with Sparse Rewards; 10 pages; dated 2018.
European Patent Office, International Search Report and Written Opinion of Ser. No. PCT/US2019/051065; 18 pages; dated Dec. 13, 2019.

* cited by examiner

DEEP REINFORCEMENT LEARNING-BASED TECHNIQUES FOR END TO END ROBOT NAVIGATION

BACKGROUND

Assistive robots, last-mile delivery, warehouse navigation, and robots in office environments are all applications that require robust robot navigation in dynamic environments. While methods exist for robot navigation sub-tasks, such as localization and mapping, motion planning, and control, current local navigation methods typically must be tuned for each new robot and environment. For example, vision-based navigation typically relies on high-level motion primitives such as "go straight" and "turn left" that abstract away robot dynamics. On the other hand, motion planning handles robot dynamics, but often requires near-perfect sensor observations.

SUMMARY

Some implementations disclosed herein are related to using reinforcement learning to train a policy network that can be utilized by a robot in performing robot navigation and/or other robotic tasks. Two examples of robot navigation are point to point navigation and path following navigation. Point to point navigation creates trajectories from a robot's current pose (position and/or orientation) to a given target pose. Path following creates trajectories to stay near a given guidance path (e.g., provided by a higher-level path planner), which can be expressed as a sequence of waypoints. Various implementations disclosed herein can implement these and/or other navigation behaviors via an end to end policy network trained using reinforcement learning, such as an end to end policy network that directly maps robot state data to an action that can be utilized to directly control a robot. For example, the robot state data can include noisy observations from a lidar component and/or from other vision component(s), and a learned end to end policy can be utilized to process the robot state data and generate linear and/or angular velocities to be implemented by the robot. Such a policy can be utilized to iteratively process state data at a relatively high frequency and iteratively generate and implement corresponding control output at a relatively high frequency, thereby causing a robot to implement desired navigation behaviors.

Various implementations disclosed herein use reinforcement learning to train a policy network (e.g., a feed forward neural network or other neural network) that represents a policy and that can be utilized to reach a navigation objective. Reinforcement learning is often used to train a policy network in view of rewards that are based on success/failure of the "true objective" (e.g., the target pose in point to point navigation). However, reinforcement learning can fail and/or result in inaccurate and/or non-robust policies when the rewards are sparse, which would be the case for navigation behaviors if the rewards were based on only the true objective. Reward shaping addresses this problem by introducing a proxy reward function that is less sparse than the true objective. Such a proxy reward function can be considered by a critic during reinforcement learning. However, reward shaping often involves hand-chosen shaped rewards, and poorly chosen shaped rewards can lead to pathologies where agents learn to exploit the reward function or to terminate the episode early.

In view of these and other considerations, implementations disclosed herein present various techniques for automatically shaping the reward. For example, some of those implementations determine a set of reward weights to use in generating a parameterized atomic reward that can be used by a critic during reinforcement learning. For instance, some of those implementations perform multiple instances of reinforcement learning on each of a plurality of separate instances of the same actor and critic network, where each of the multiple instances of reinforcement learning utilize a separate set of reward weights to be processed by the critic network during the reinforcement learning. A single set of reward weights is then selected, from the sets of reward weights, to use as fixed reward weights. Selecting the single set of reward weights can be based on evaluation of the separate instances of the same actor and critic network. For example, each of the separate instances of the same actor and critic network can be evaluated to determine which achieves the maximum "true objective" reward, and the set of reward weights utilized in reinforcement learning for that network can be selected as the single set of reward weights. As described in detail herein, the sets of reward weights considered and used in the multiple instances of reinforcement learning can be chosen randomly (e.g., truly randomly or pseudo-randomly) for the initial instances of reinforcement learning, then chosen based on an optimization procedure for further instances of reinforcement learning.

Further, various implementations disclosed herein then utilize the single set of reward weights to then optimize network layer sizes (e.g., widths of the policy network and/or critic network) and/or other network hyperparameters to identify the most successful policy for the given robotic task (e.g., navigation task). For example, some of those implementations use the single set of reward weights in performing reinforcement learning on each of a plurality of separate actor and critic network pairs, where each of the actor and critic network pairs have one or more hidden layer widths (and/or other hyperparameters) that are distinct from other hidden layer widths (and/or other hyperparameters) of other actor and critic network pairs. A single actor and critic network pair can then be selected, from the actor and critic network pairs, and the single actor and critic network pair and the single set of reward weights used in performing further reinforcement learning training. After such further training, the trained actor network can then be utilized as the policy network and utilized in performing a corresponding task, such as a robotic navigation task. Policy networks trained in such a manner can achieve high levels of robustness and/or accuracy for robotic navigation tasks, including robust obstacle avoidance during navigation. Further, such policy networks can be trained using simulation data, and can successfully transfer to physical robots with reduced (and even no) domain adaptation based on physical robot training episodes.

Accordingly, various implementations disclosed herein relate to techniques for automatically learning a reward function and a neural network architecture in generating of a control policy (e.g., a robotic control policy) through reinforcement learning.

Implementations disclosed herein describe a policy/actor network and a critic network, each of which can be a machine learning model, such as a neural network model. Moreover, as described herein, implementations of the reinforcement learning utilized in training the networks utilize an adaptation of Deep Deterministic Policy Gradient (DDPG) reinforcement learning. More particularly, implementations adapt DDPG through the automated reward-shaping and network-shaping described herein, to determine a reward and network architecture that provides significant improvements over manually chosen reward and/or network hyperparameters. Implementations disclosed herein train and utilize a policy/actor network that can be utilized by a robot to continuously process state data and continuously generate robotic actions to achieve a task objective. As mentioned above, the current state data can include vision data captured by a vision component of the robot (e.g., 1D depth data captured by a 1D lidar component, a 2D image from a monographic camera, a 2.5D image from a stereographic camera, and/or a 3D point cloud from a 3D lidar component). The current state data can include only the vision data, or can optionally include additional data such as a current pose of the robot, a target pose of the robot, etc. Generated robotic actions can directly or indirectly indicate actions to be implemented by the robot in view of processed state data. For example, robotic actions can indicate a linear and/or angular velocity for the robot, and commands can be provided to actuator(s) of the robot to achieve the linear and/or angular velocity.

The above description is provided as an overview of only some implementations disclosed herein. These and other implementations are described in more detail herein.

In some implementations, a method is provided that includes: determining a given set of reward weights to use in generating parameterized atomic rewards to be processed by a critic network during training of the trained policy network. Determining the given set of reward weights includes: selecting a given actor network and a given critic network; selecting a plurality of sets of reward weights, including the given set of reward weights; performing a plurality of reward-shaping reinforcement learning trials, each using a respective instance of the given actor network and the given critic network, and using a respective one of the sets of reward weights, where performing each of the reward-shaping reinforcement learning trials includes: training the respective instance of the given actor network and the given critic network using reinforcement learning based on training episodes (e.g., robot navigation training episodes), including using the respective one of the sets of reward weights in generating respective parameterized atomic rewards to be processed by the respective instance of the given critic network during the training. Determining the given set of reward weights further includes: evaluating, after the training, each of the respective instances of the given actor network to generate a respective evaluation metric; and selecting the given set of reward weights, from the plurality of sets of reward weights, based on the respective evaluation metric for the respective instance of the given actor network, trained using the given set of reward weights. The method further includes selecting a given actor network and critic network pair, after selecting the given set of reward weights. Selecting the given actor network and critic network pair includes: generating a plurality of actor network and critic network pairs, each of the actor network and critic network pairs having unique hyperparameters; performing a plurality of network-shaping reinforcement learning trials, each using the selected given set of reward weights, and using a respective pair of the actor network and critic network pairs; evaluating, after the training, the actor network of each of the actor network and critic network pairs, to generate a respective additional evaluation metric; and selecting the actor network of the given actor network and critic network pair, from the actor network and critic network pairs, based on the respective additional evaluation metric for the actor network of the given actor network and critic network pair. The method further includes, in response to selecting the given actor network and critic network pair, using the selected given actor network and critic network pair and the selected given set of reward weights in generating the trained policy network. The trained policy network includes the actor network, of the selected given actor network and critic network pair, after reinforcement learning based on the selected given set of reward weights.

These and other implementations of the technology disclosed herein can include one or more of the following features.

In some implementations, the evaluation metrics each indicate performance of a respective one of the instances of the given actor network with respect to only a task objective reward for a robot navigation task. In some of those implementations, the robot navigation task is one of a point to point navigation task and a path following navigation task.

In some implementations, the additional evaluation metrics each indicate performance of a respective actor network, of the actor network and critic network pairs, with respective to a cumulative reward that is a function of the task objective reward and one or more additional rewards.

In some implementations, the hyperparameters include widths for one or more hidden layers of the actor network and critic network pairs.

In some implementations, the hyperparameters consist of widths for one or more hidden layers of the actor network and critic network pairs.

In some implementations, the hyperparameters define the structure of hidden layer(s) of the actor network and critic network pairs. In some of those implementations, the hyperparameters define a quantity of hidden layers, a quantity of hidden units in a hidden layer, and/or connections between hidden units of hidden layers.

In some implementations, the hidden layers are feed-forward layers.

In some implementations, the given set of reward weights include a first reward weight for a first reward component that indicates whether a goal location has been reached, and a second reward weight for a second reward component that indicates a distance to the goal location or a distance to an un-reached waypoint. In some of those implementations, the given set of reward weights further include a third reward weight for a third reward component that indicates whether a collision with an obstacle is occurring.

In some implementations, selecting the plurality of sets of reward weights includes selecting an initial subset of the sets of reward weights, and selecting an additional subset of the initial subset after performing an initial subset of the reward-shaping reinforcement learning trials using the initial subset of the sets of reward weights. In some versions of those implementations, selecting the initial subset of the sets of reward weights includes randomly selecting the initial subset, and selecting the additional subset includes selecting the additional subset based on an optimization performed after performing the initial subset of the reward-shaping reinforcement learning trials using the initial subset of the sets of reward weights.

In some implementations, selecting the actor network and critic network pairs includes selecting an initial subset of the actor network and critic network pairs, and selecting an additional subset of the actor network and critic network pairs after performing an initial subset of the network-shaping reinforcement learning trials using the initial subset of the actor network and critic network pairs. In some of those implementations, selecting the initial subset of the actor network and critic network pairs includes randomly selecting the hyperparameters for the initial subset. Selecting the additional subset can include selecting the additional subset based on an optimization performed after performing the initial subset of the network-shaping reinforcement learning trials using the initial subset of the actor network and critic network pairs.

In some implementations, the reinforcement learning is Deep Deterministic Policy Gradient (DDPG) reinforcement learning.

In some implementations, the training episodes are robot navigation episodes. The robot navigation episodes can include simulated robot navigation episodes and/or real robot navigation episodes.

In some implementations, the actor networks and the critic networks process, during the reinforcement learning, state data that includes robot vision sensor data. In some of those implementations, the robot vision sensor data includes one-dimensional depth data, such as real or simulated LIDAR data.

In some implementations, the state data includes a current robot pose and/or a goal robot pose.

In some implementations, a method is provided that includes performing multiple instances of reinforcement learning on each of a plurality of separate instances of the same actor and critic network. Each of the multiple instances of reinforcement learning utilize a separate set of reward weights to be processed by the critic network during the reinforcement learning. The method further includes selecting, from the sets of reward weights, a single set of reward weights to use as fixed reward weights for the trained policy network. Selecting the single set of reward weights is based on evaluation of the separate instances of the same actor and critic network. The method further includes using the single set of reward weights in performing reinforcement learning on each of a plurality of separate actor and critic network pairs. Each of the actor and critic network pairs have network architectures that are distinct from other network architectures of other actor and critic network pairs. The method further includes selecting, from the actor and critic network pairs, a single actor and critic network pair. The method further includes using the single actor and critic network pair and the single set of reward weights in performing reinforcement learning to train at least the actor network of the single actor and critic network pair. The method further includes, after performing the reinforcement learning, using the trained actor network (of the single actor and critic network pair) as the trained policy network.

These and other implementations of the technology disclosed herein can include one or more of the following features.

In some implementations, using the trained actor network as the trained policy network includes using the trained network to control a robot in performing a robot task that corresponds to the reinforcement learning. In some of those implementations, the robot task is robot navigation.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
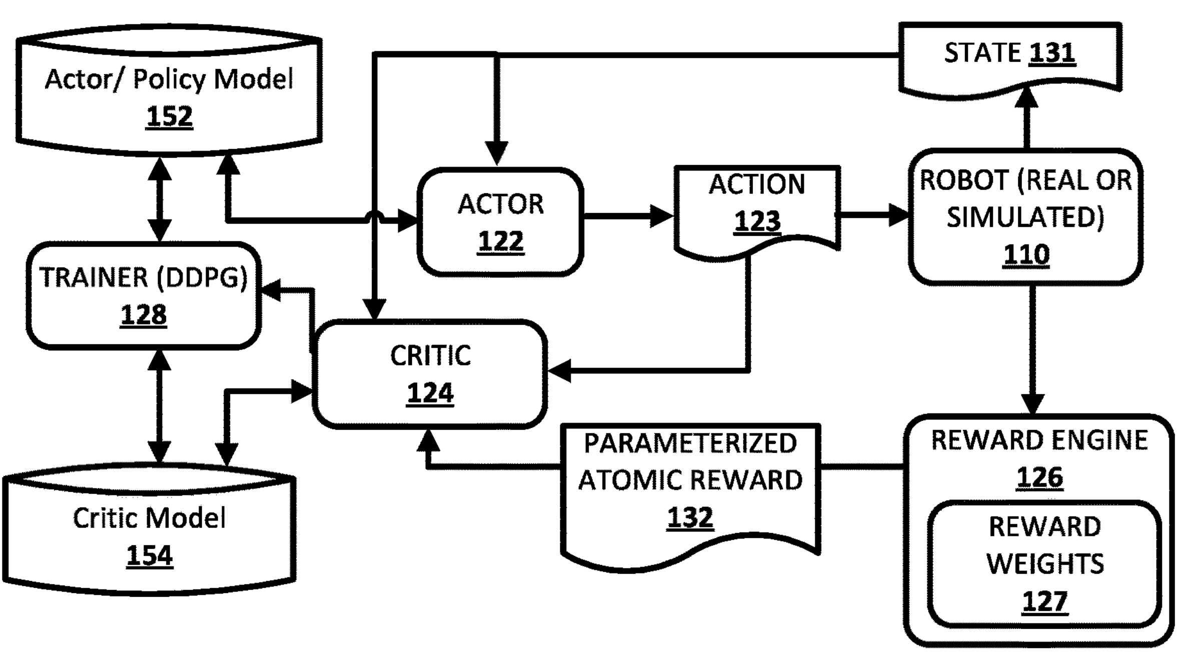
FIG. 1 illustrates an example environment in which implementations disclosed herein can be implemented.
Figure 1:
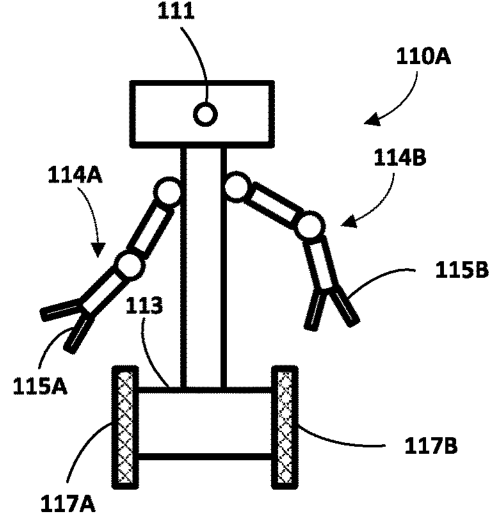

Implementations described herein model a robot, in performing a navigation task and/or other task, as an (O, A, D, R, $\gamma$) tuple representing a partially observable Markov decision process (POMDP) with continuous observations and actions. The first three observations (O, A, D) are determined by the robot. The observations, $o=(o_l,o_g)\theta_n \in O$, are $\theta_n$ can be pairs of vision data, such as pairs of 1-D Lidar vectors, $O_l$, and goal set, $O_g$ observed over the last $\theta_n$ steps. The robot is controlled by continuous action vector A, such as a 2-dimensional continuous vector $a=(\upsilon, \phi) \in A$, that encodes the robot's linear velocity ($\upsilon$) and angular velocity ($\phi$). The dynamics, D, is encoded in the simulator or implicit in the real world. The remaining factors encode the task: $\gamma \in (0,1)$ is a scalar discount factor, and R is the structure of the reward R.

The goal of a navigation agent is to complete a true navigation objective. For point-to-point navigation this is arriving at a goal location, while for path following this is traversing the entire path by reaching all its waypoints. This can be formalized as learning a policy that maximizes the probability of reaching the true objective, G, $$\tilde{\pi} = \underset{\pi}{\operatorname{argmax}} \mathbb{P}(G(s) \mid \pi),$$

where $\mathbb{P}$ (G(s)|$\pi$) means that true objective G is reachable from the state s under control of policy $\pi$.

Reinforcement learning is utilized to learn a policy that maximizes the cumulative reward. While the true objective could be utilized as a reward, it is sparse, and there are other requirements, such as dynamical feasibility, smooth trajectories, avoiding obstacles, and sensory/motor limitations. These requirements can be formulated as parameterized atomic rewards which provide more timely feedback to aid learning. More formally, the atomic rewards can be represented by $$R\theta_r(s, a) = \sum_{i=1}^{nr} r\ i(s, a, \theta_{ri}),$$

where $r_i(s, a, \theta r_i)$ is a parameterized atomic reward and $\theta_r=[\theta r_1 \ldots \theta r_1 \ldots \theta r_{nr}]$ becomes a hyperparameter to be tuned.

The goal of a point to point (P2P) robotic navigation task is to navigate a robot to a goal position without collision. The robot can be well-localized using traditional methods. The P2P behavior can be used as a local planner for sampling-based planners in order to navigate large environments. The true objective of P2P is to maximize the probability of reaching the goal during an episode, $G_{P2P}(s)=\mathbb{I}(\|s-s_g\|<d_{P2P})$, where $\mathbb{I}$ is an indicator function, $s_g$ is the goal pose, and $d_{P2P}$ is the goal size. The goal observation $o_g$ is the relative goal position in polar coordinates, which is readily available from localization. The reward for P2P is:

$$R\theta_{rP2P} = \theta_{rP2P}^T[r_{step} r_{goalDist} r_{collision} r_{turning} r_{clearance} r_{goal}],$$

where $r_{step}$ is a constant penalty step with value 1, $r_{goalDist}$ is the negative Euclidean distance to the goal, $r_{collision}$ is 1 when the agent collides with obstacles and 0 otherwise, $r_{turning}$ is the negative angular speed, $r_{clearance}$ is the distance to the closest obstacle, and $r_{goal}$ is 1 when the agent reaches the goal and 0 otherwise.

The goal of a path following (PF) robotic navigation task is to follow a guidance path represented by a sequence of waypoints in the workspace. The guidance path can be assumed to be collision free, and can be generated by path planners such as those that utilize Probabilistic Roadmap (PRMs) algorithm(s), rapidly-exploring random tree (RRT) algorithm(s), and/or other technique(s). The guidance path can additionally or alternatively be generated manually, because it does not need to be dynamically feasible. In navigation stack terms, PF is trajectory tracking. While PF can be used with higher-level planners, it has several complications. Since waypoints in the guidance path are intermediate goals that the agent should approach with a speed and orientation appropriate to reach the next point, the spacing and number of waypoints matters. In addition, when the agent veers off the path near a waypoint to avoid an obstacle, it becomes less clear if it should continue towards the next waypoint, or prioritize getting back on the path. Implementations of the shaped-reward disclosed herein can mitigate these and/or other issues.

Real-world navigation involves long guidance paths (e.g., 100+ meters) with many waypoints and varied separation. However, varied input size and non-uniformity can challenge neural networks. To address this problem, implementations disclosed herein linearly interpolate the original guidance path $\mathcal{P}_o$ to generate a new guidance path $\mathcal{P}$ including new waypoints with a substantially constant separation $d_{ws}$ between consecutive waypoints. For example, the substantially constant separation $d_{ws}$ can be truly constant, or the separation between each pair of waypoints can be within +/−5% (or less) of a given distance. The $i^{th}$ waypoint $w_i$ is considered reached when the robot is within $d_{wr}$ of the waypoint and the previous waypoint $w$ is also reached. The true objective of PF is to reach as many waypoints per episode as possible, as represented by:

$$G_{PF}(s) = \frac{\sum_{w \in \mathcal{P}} \mathbb{I}(\|s - w\| < d_{WT})}{\|\mathcal{P}\|}$$

where the goal observation, $o_g$, is a partial path consisting of the first un-reached waypoint and the next $N_{partial}$ waypoints. For example, suppose $d_{wr}=0.3$, $d_{ws}=1$, $N_{partial}=2$, the robot is at [0, 0] and $\mathcal{P}$ consists of [[0, 0], [1, 0], [1, 1], [1, 2], [1, 3]], the observation is [[1, 0], [1, 1], [1, 2]].

The reward for PF can be represented by $$R\theta_{rPF} = \theta_{rPF}^T[r_{step} r_{dist} r_{collision}],$$

where $r_{step}$ is a constant penalty step with value 1. $r_{dist}$ is the Euclidean distance to the first un-reached waypoint. $r_{collision}$ is 1 when the agent collides with obstacles and 0 otherwise.

With observations, action space, true objectives, and rewards defined, training a vanilla DDPG requires selecting actor and critic network architectures. Network architecture affects the quality of the trained agent, as the capacity of the network determines what the agent can learn. For actor and critic, feed-forward fully-connected networks can be chosen. In some implementations, the network depth is fixed, leaving the size of each layer as a tunable network hyperparameter.

A feed-forward fully-connected neural network with rectified linear units (RELUs) and n layers can be represented by FF(θ), for $\theta \in \mathbb{R}^n$, where i-th layer contains $\theta_i$ neurons. Learnable weights of the feed forward network FF(θ) can be represented as $W_\theta$. With such a representation, the DDPG parametrization can be formalized as $DDPG(\theta_\pi, \theta_Q, \theta_r)$ being a DDPG algorithm with actor $\pi(s|W_\pi)=FF(\theta_\pi)$, critic $Q(s, a|W_Q)=FF(\theta_Q)$, and reward given by $$R\theta_r(s, a) = \sum_{i=1}^{nr} r\ i(s, a, \theta_{ri}).$$

Further, $Obj(\theta_\pi, \theta_Q, \theta_r|G) \in \mathbb{R}$ can represent the true objective the trained actor $\pi(s|W_\pi)$ achieved for the corresponding DDPG $(\theta_\pi, \theta_Q, \theta_r)$. DDPG hyperparameter selection can be automated with, for example, off-the-shelf gradient-free optimization, and shaping can be split into two phases: (1) reward shaping and (2) network shaping. First, the best reward function (e.g., the best reward weights) can be determined with respect to the task's true objective for a fixed actor and critic. Then, the best actor and critic networks (e.g., the best network architectures) can be determined with respect to the previously selected reward function.

For reward shaping, actor and critic network shapes can be fixed sizes $\theta_\pi, \theta_Q \in I(n_{min}, n_{max})$, where I(a, b) is a closed interval in n-dimensional space bounded by points $a, b \in \mathcal{P}^n$. Further, $n_g$ reward-shaping reinforcement learning trials can be performed, with at most $n_{mc}$ reward-shaping reinforcement learning trials being performed in parallel. At each trial i, the reward function $\theta_r(i)$ is initialized from $I(0,1)^n$, based on all completed trials according to, for example, a black-box optimization algorithm. Since no prior trials are yet available for optimization, the first $n_m$, trials can select reward weights randomly (e.g., truly randomly or pseudo-randomly). Next, an asynchronous instance of DDPG ($\theta_\pi$, $\theta_Q$, $\theta_r$)(i)) is trained. After the agent is trained, its policy is evaluated in accordance to the true task $$\text{objective } \tilde{\pi} = \underset{\pi}{\operatorname{argmax}} \mathbb{P}(G(s) \mid \pi).$$

Upon completion of all $n_g$ reward-shaping trials, the best reward $$\tilde{\theta} r = \underset{i}{\operatorname{argmax}} Obj(\theta_\pi, \theta_Q, \theta_r(i) \mid G)$$

corresponds to the trial with the highest true task objective. Then, a similar process is performed to find the best actor and critic with respect to $\widetilde{\theta r}$. In this case, the optimization objective is to maximize the cumulative reward. This time, at each network-shaping trial DDPG ($\theta_\pi$(j),$\theta_Q$(j), $\widetilde{\theta r}$) is trained asynchronously, and the objective evaluated with respect to $$R\theta_r(s, a) = \sum_{i=1}^{nr} r\ i(s, a, \theta_{ri}).$$

The best actor and critic architectures correspond to the trial with the best return $\widetilde{\theta \pi}$ $$\tilde{\theta} Q = \underset{j}{\operatorname{argmax}} Obj(\theta_\pi(j), \theta_Q(j), \tilde{\theta} r),$$

and the final policy trained is represented by:

$$\tilde{\pi}(s \mid W_{\tilde{\theta}_\pi}) = DDPG(\tilde{\theta}_\pi, \tilde{\theta}_Q, \tilde{\theta}).$$

Turning now to the Figures, FIG. 1 illustrates an example environment in which implementations disclosed herein can be implemented. FIG. 1 includes an actor 122, that receives states 131 from a robot 110 (that can be real or simulated), and generates a predicted action based on an actor policy network 152 and its current trained weights. The action 123 is provided to the robot 110, which implements the action 123 (e.g., generates control commands based on the action 123), thereby causing the state 131 to change, and the new state to again be provided to the actor 122. This process continues iteratively for many iterations, relying on update values at each iteration, during an episode in reinforcement learning and/or at inference time. The action 123 is also provided to a critic 124, along with the state 131, and a parameterized atomic reward 132. The reward engine 126 generates the parameterized atomic reward 132 based on reward weights 127 and based on the state 131 and/or other data from the robot 110. The critic 124 generates output using the critic model 154, and the state 131, action 123, and parameterized atomic reward 132, where the output indicates the likelihood of the action 123 maximizing a cumulative reward in view of the state 131 and the parameterized atomic reward 132. The trainer 128 (which can use a DDPG algorithm) updates the actor/policy network 152 and the critic model 154 based on the provided output. This process can likewise continue iteratively for many iterations, relying on updated values at each iteration, during an episode in reinforcement learning and/or at inference time. Only a single instance of actor 122, critic 123, trainer 128, models 152 and 154, reward engine 126, reward weights 127, etc. are illustrated in FIG. 1. However, as described herein, in many implementations multiple instances of collections of such components will be utilized in reward-shaping and network-shaping according to implementations disclosed herein.

Robot 110A is also illustrated in FIG. 1, and is one example of a physical (i.e., real-world) mobile robot that can utilize a policy network, trained according to implementations disclosed herein, in the performance of robot navigation and/or other robotic tasks. Moreover, in some implementations, robot 110A can additionally or alternatively be utilized during reinforcement learning in training of the policy network. Additional and/or alternative robots may be provided, such as additional robots that vary in one or more respects from robot 110A illustrated in FIG. 1. For example, a mobile forklift robot, an unmanned aerial vehicle ("UAV"), and/or a humanoid robot may be utilized instead of or in addition to robot 110

Robot 110A includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110A also includes a vision sensor 111 that can generate vision data related to shape, color, depth, and/or other features of object(s) that are in the line of sight of the vision sensor 111. The vision sensor 111 may be, for example, a 1D lidar, a monocular camera, a stereographic camera, and/or a 3D lidar.

Robot 110 also includes one or more processors that, for example: provide control commands to actuators and/or other operational components thereof based on actions generated utilizing a policy network trained according to implementations disclosed herein. The robot 110 also includes robot arms 114A and 114B with corresponding end effectors 115A and 115B that each take the form of a gripper with two opposing "fingers" or "digits." The robot arms 114A, 114B and end effectors 115A, 115B may be controlled autonomously, semi-autonomously, and/or based on control commands provided by a user via a computing device of a user. Although particular grasping end effectors 115A, 115B are illustrated, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although a particular placement of vision sensor 111 is illustrated in FIG. 1, additional and/or alternative placements may be utilized. For example, in some implementations a vision sensor may be mounted on arm 114A or on end effector 115A. Further, in various implementations robot 110A can employ multiple vision sensors, of the same and/or of disparate types.

Figure 2A:
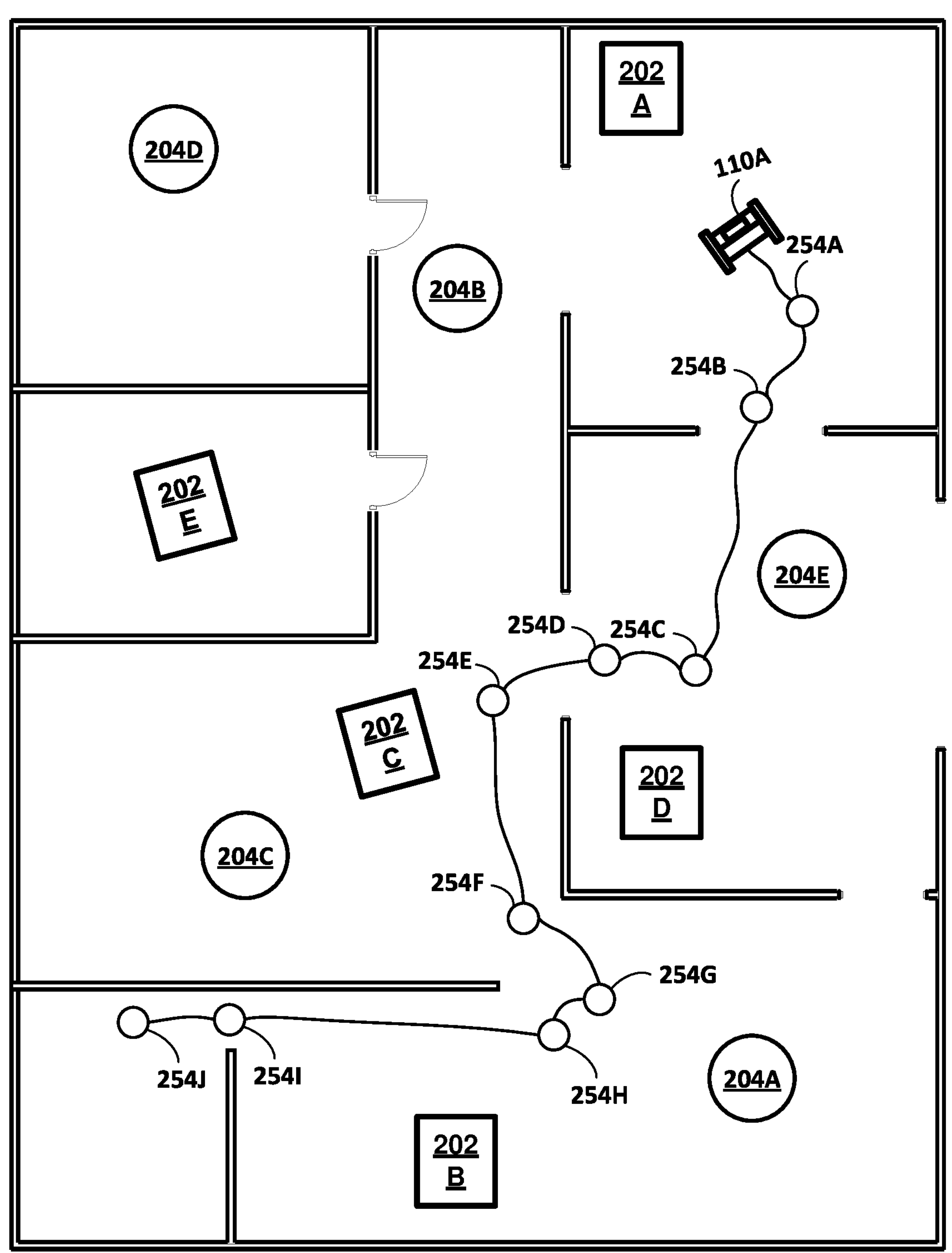
FIG. 2A illustrates an example environment, a robot, static and dynamic objects, and initially defined waypoints for a path following navigation task.
Figure 2B:
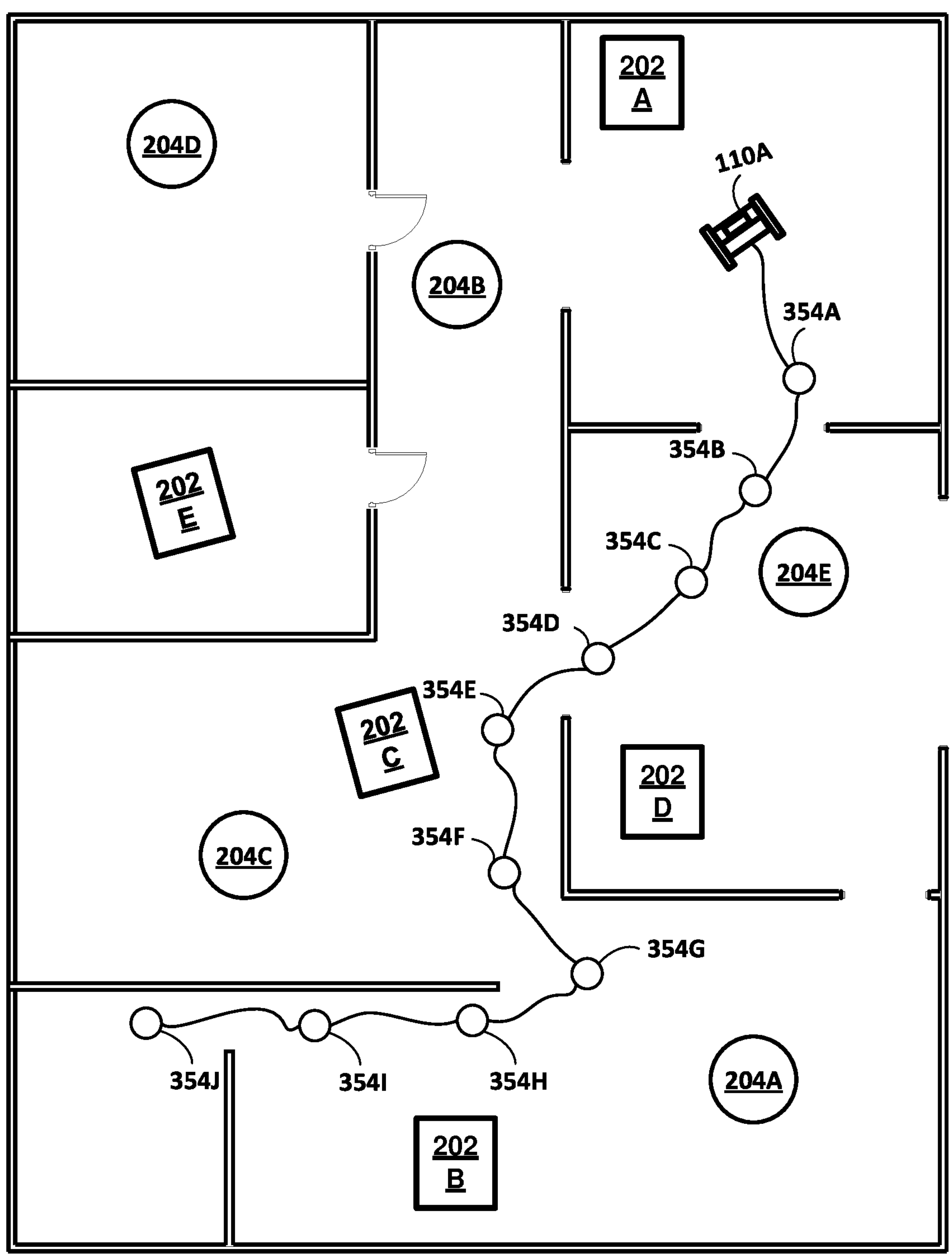
FIG. 2B illustrates the same example environment, robot, and static and dynamic objects as FIG. 2A, but illustrates refined waypoints for the path, generated to provide a substantially constant separation distance between the waypoints.

FIG. 2A illustrates an example environment, the robot 110A, static objects 202A-E, and dynamic objects 204A-E. FIG. 2A also illustrates initially defined waypoints 254A-J for a path following navigation task. The initially defined waypoints 254A-J can be provided by, for example, a higher-level path planner. As can be appreciated from viewing FIG. 2A, the initially defined waypoints 254A-J are not uniformly spaced. Since non-uniformity can challenge neural networks, in many implementations described herein the initially defined waypoints 254A-J can be pre-processed to generate the refined waypoints 354A-J of FIG. 2B. This can be performed during reinforcement learning and/or at inference time, to provide a substantially constant separation distance between the waypoints, and improve training of the policy network and/or performance of the policy network. In various implementations, the original guidance path between the initially defined waypoints 254A-J can be linearly interpolated to generate a new guidance path that includes the reined waypoints 354A-J with a constant separation $d_{ws}$ between consecutive waypoints. FIG. 2A is an example of a simulated and/or real-world environment in which the robot 110A can perform a path following navigation task utilizing a policy network trained to perform path following. In the simulated environment, dynamic objects can be caused to move (e.g., randomly, pseudo-randomly, and/or according to a script) during reinforcement learning. Larger, smaller, more complex and/or less complex environments can be utilized—and a variety of environments can be utilized during reinforcement learning to improve robustness.

Figure 3:
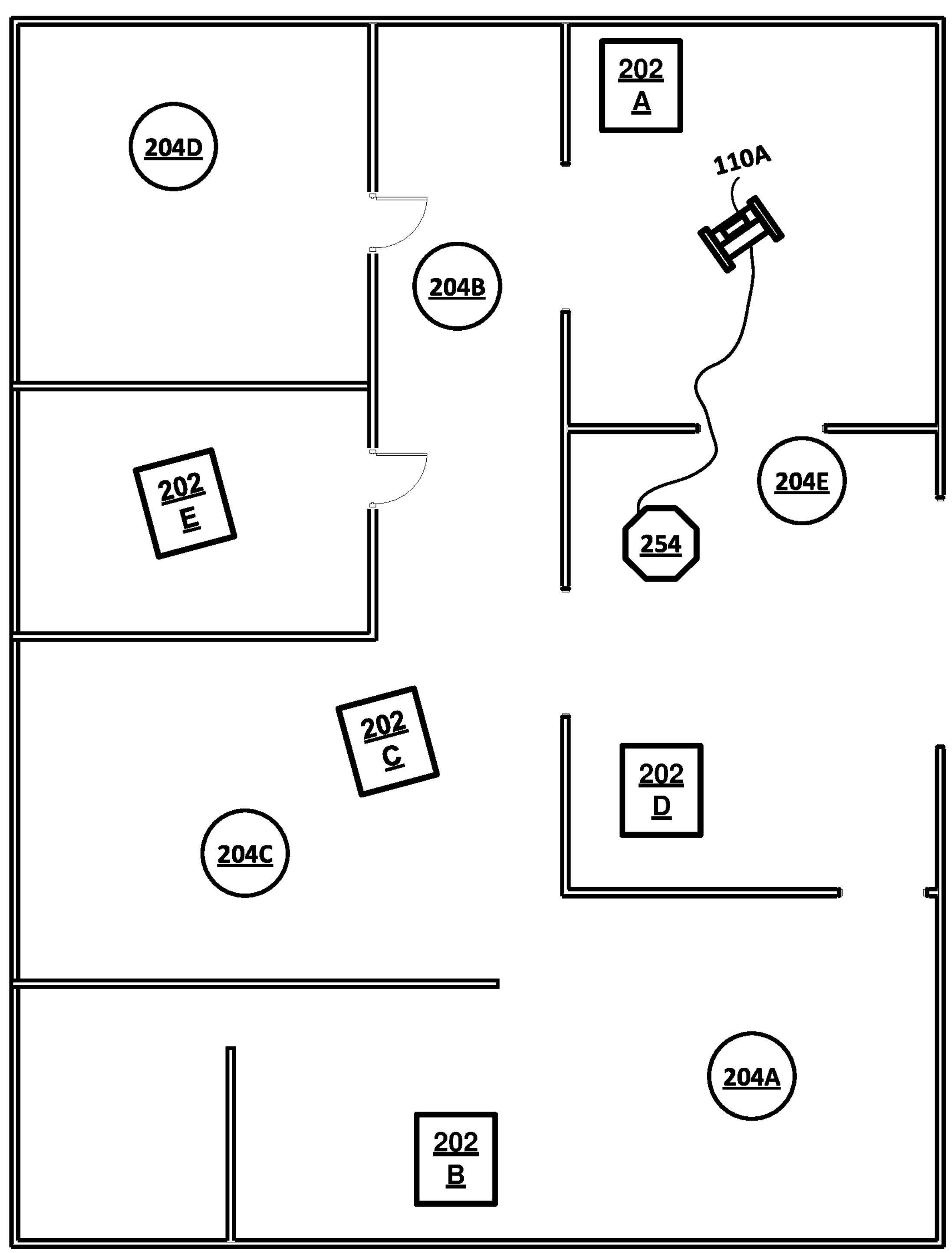
FIG. 3 illustrates the same example environment, robot, and static and dynamic objects as FIG. 2A, but illustrates a target point for a point to point navigation task, in lieu of defined waypoints for a path following task.

FIG. 3 illustrates the same example environment, robot 110A, and static and dynamic objects 202A-E and 204A-E as FIG. 2A, but illustrates a target point 254 for a point to point navigation task, in lieu of defined waypoints for a path following task. FIG. 3 is an example of a simulated and/or real-world environment in which the robot 110A can perform a point to point navigation task utilizing a policy network trained to perform point to point navigation. In the simulated environment, dynamic objects can be caused to move (e.g., randomly, pseudo-randomly, and/or according to a script) during reinforcement learning.

Figure 4:
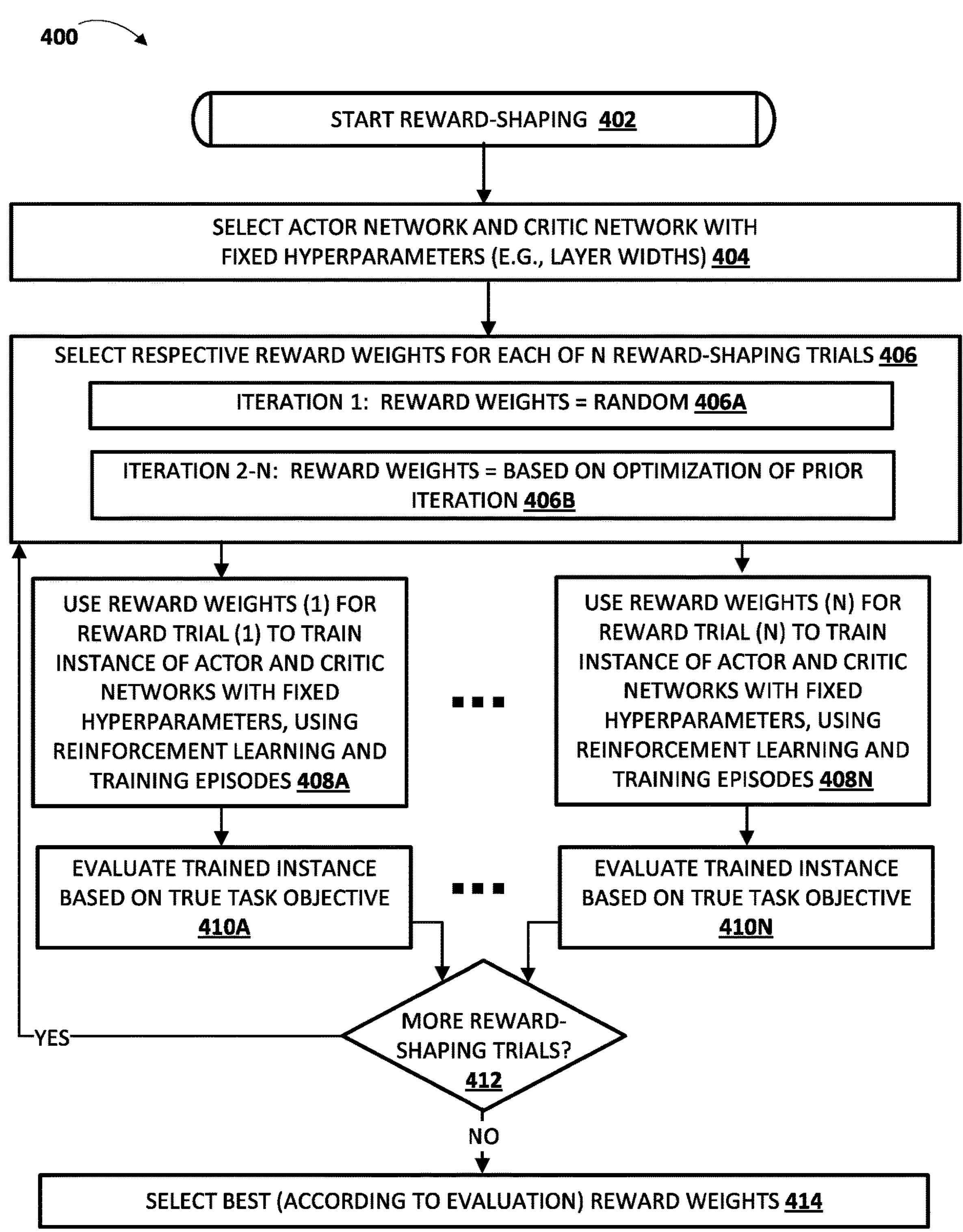
FIG. 4 is a flowchart illustrating an example method of reward-shaping according to various implementations disclosed herein.

FIG. 4 is a flowchart illustrating an example method 400 of reward-shaping according to various implementations disclosed herein. For convenience, the operations of the flow chart are described with reference to a system that performs the operations. This system may include one or more components of one or more computer systems, such as one or more processors. Moreover, while operations of method 400 are shown in a particular order, this is not meant to be limiting. One or more operations may be reordered, omitted or added.

At block 402, the system starts reward-shaping.

At block 404, the system selects an actor network and a critic network with fixed hyperparameters. The fixed hyperparameters can include, for example, width(s) of layer(s) of the corresponding network. For example, the actor network can have multiple layers each having corresponding fixed widths. Also, for example, the critic network can have multiple layers each having corresponding fixed widths.

At block 406, the system selects respective reward weights for each of N reward-shaping trials. For example, the system selects first reward weights for a first reward-shaping trial, distinct separate reward weights for a second reward-shaping trial, etc. In a first iteration of block 406, sub-block 406A can be performed, where the reward weights selected in the first iteration are selected randomly (e.g., truly random, or pseudo-random). In subsequent iterations of block 406, sub-block 406B can instead be performed, where the reward weights selected in those subsequent iterations can be based on optimizations that are based on prior iterations of blocks 408A-N and 410A-N. For example, in those subsequent iterations an optimization procedure is utilized to select the weights, based on the previously selected weights and based on evaluation (in blocks 410A-N) of the respective trained instances learned using those previously selected weights.

After block 406, the system performs blocks 408A-N, optionally in parallel. In block 408X, respective reward weights for the respective trial are utilized to train a respective instance of the same actor and critic network with the fixed hyperparameters, using reinforcement learning and training episodes. For example, in block 408A first reward weights for a first reward trial are utilized to train a first instance of the actor and critic network with the fixed hyperparameters. Further, in block 408N disparate reward weights for a different reward trial are utilized to train a different instance of the actor and critic network with the fixed hyperparameters. Other reward weight(s) and corresponding reward trial(s) can be performed as indicated by the ellipsis between blocks 408A and 408N.

At blocks 410A-N, the system evaluates a respective trained instance based on a true task objective $$\left(\text{i.e., } \tilde{\pi} = \underset{\pi}{\operatorname{argmax}} \mathbb{P}(G(s) \mid \pi)\right).$$

For example, at block 410A the system evaluates the trained instance of the actor and critic network that was trained in block 408A using the reward weights for block 408A. Also, for example, at block 410N the system evaluates the different trained instance of the actor and critic network that was trained in block 408N using the different reward weights for block 408N.

At block 412, the system determines whether to perform more reward-shaping trials. This decision can be based on, for example, whether a threshold quantity of reward-shaping trials have been performed, whether the most recent evaluations of blocks 410A-N satisfy a threshold, and/or other factor(s).

If, at an iteration of block 412, the system determines to perform more reward-shaping trials, the system proceeds back to block 406 and selects new reward weights, then performs another iteration of blocks 408A-N using respective of those new reward weights, and performs another iteration of blocks 410A-N based on additional trained instances trained using those new reward weights. If, at an iteration of block 412, the system determines to not perform more reward-shaping trials, the system proceeds to block 414 and selects best reward weights, where the "best" is according to the evaluations of one or more iterations of blocks 410A-N. For example, the system can select the reward weights that resulted in a respective trained instance having the best performance relative to the true task objective. As mentioned herein, the true task objective can vary from task to task. For example, a first objective can be utilized for a path following navigation task and a second objective can be utilized for a point to point navigation task.

Figure 5:
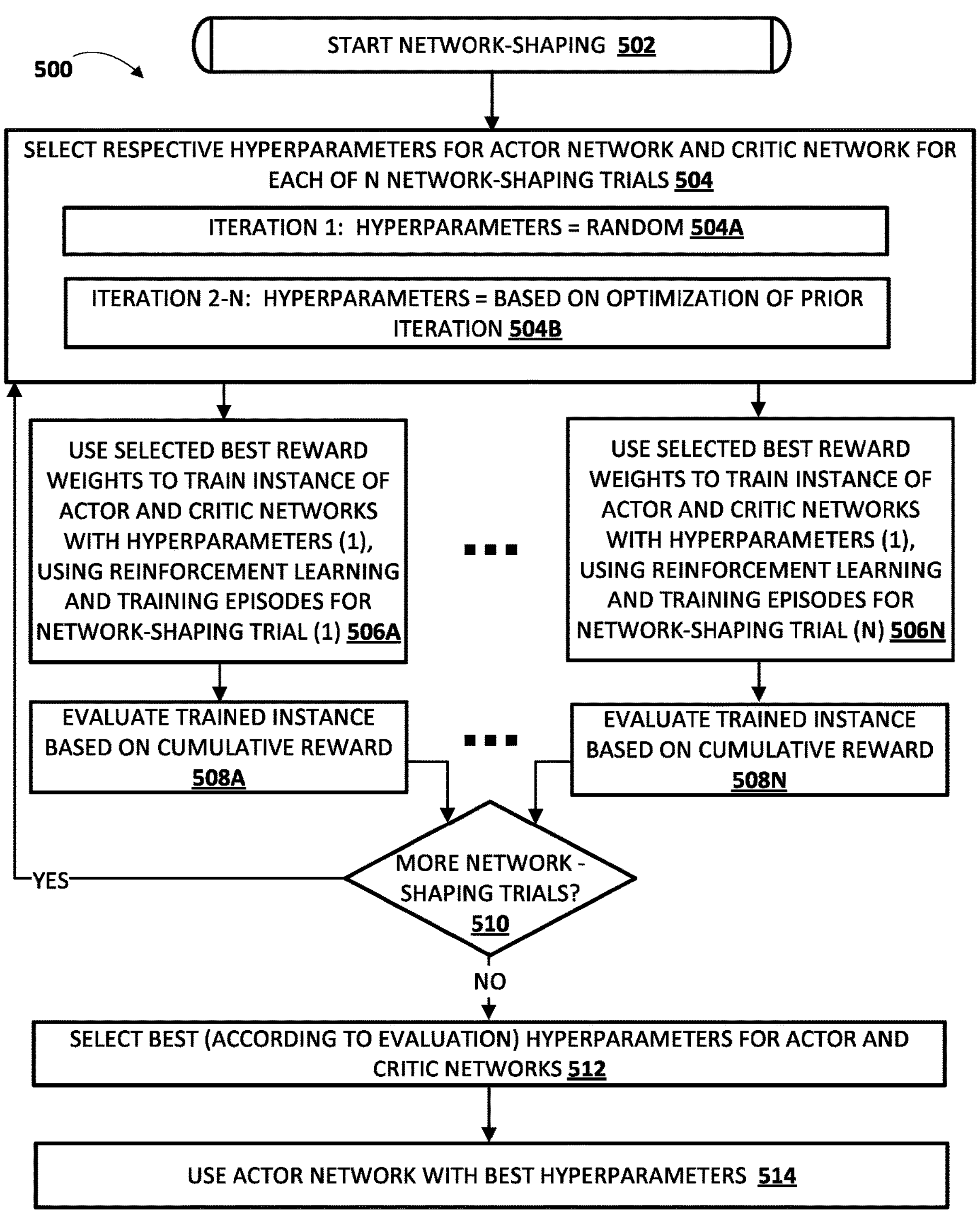
FIG. 5 is a flowchart illustrating an example method of network-shaping according to various implementations disclosed herein.

FIG. 5 is a flowchart illustrating an example method 500 of network-shaping according to various implementations disclosed herein. For convenience, the operations of the flow chart are described with reference to a system that performs the operations. This system may include one or more components of one or more computer systems, such as one or more processors. Moreover, while operations of method 500 are shown in a particular order, this is not meant to be limiting. One or more operations may be reordered, omitted or added.

At block 502, the system starts network-shaping. In many implementations, block 502 is performed after completion of method 400.

At block 504, the system selects respective hyperparameters for an actor network and critic network for each of N network-shaping trials. The hyperparameters for a network can include, for example, those that determine the network structure and/or those that determine how the network is trained (excluding reward weights, as reward weights are determined in method 400). For example, the system selects first hyperparameters for a first network-shaping trial, distinct separate hyperparameters for a second network-shaping trial, etc. The hyperparameters can include, or be restricted to, width of hidden layers of the actor network and the critic network. The hyperparameters can additionally or alternatively include, or be restricted to, connections between hidden layers (e.g., fully connected or not fully connected) of the actor network and the critic network, quantity of hidden units within hidden layer(s) of the network(s), quantity of hidden layer(s) of the network(s), learning rate, batch size (in batch training techniques), whether dropout is utilized and/or a degree of its utilization, network weight initialization, and/or other hyperparameter (s). In a first iteration of block 504, sub-block 504A can be performed, where the hyperparameters selected in the first iteration are selected randomly (e.g., truly random, or pseudo-random). In subsequent iterations of block 504A, sub-block 504B can instead be performed, where the hyperparameters selected in those subsequent iterations can be based on optimizations that are based on prior iterations of blocks 506A-N and 508A-N. For example, in those subsequent iterations an optimization procedure is utilized to select the hyperparameters, based on the previously selected hyperparameters and based on evaluation (in blocks 508A-N) of the respective trained instances learned using those previously selected weights.

After block 504, the system performs blocks 506A-N, optionally in parallel. In block 506X, the selected best reward weights (e.g., selected using method 400) are used to train the instance of the actor and critic network with the respective hyperparameters, using reinforcement learning and training episodes. For example, in block 506A the best reward weights are used in training a first instance of actor network and critic network with first hyperparameters, in block 506B the best reward weights are used in training a second instance of actor network and critic network with different second hyperparameters, etc.

At blocks 508A-N, the system evaluates a respective trained instance based on a cumulative reward (i.e., $$R\theta_r(s, a) = \sum_{i=1}^{nr} r\ i(s, a, \theta_{ri})).$$

For example, at block 508A the system evaluates the trained instance of the actor and critic network that was trained in block 508A. Also, for example, at block 508N the system evaluates the different trained instance of the actor and critic network that was trained in block 508N.

At block 510, the system determines whether to perform more network-shaping trials. This decision can be based on, for example, whether a threshold quantity of trials have been performed, whether the most recent evaluations of blocks 508A-N satisfy a threshold, and/or other factor(s).

If, at an iteration of block 510, the system determines to perform more reward-shaping trials, the system proceeds back to block 504 and selects new hyperparameters, then performs another iteration of blocks 506A-N using respective of those new hyperparameters, and performs another iteration of blocks 508-N based on additional trained instances trained using those new hyperparameters. If, at an iteration of block 510, the system determines to not perform more network-shaping trials, the system proceeds to block 512 and selects the best hyperprameters for the actor and critic networks, where the "best" is according to the evaluations of one or more iterations of blocks 508A-N. For example, the system can select the hyperparameters that resulted in a respective trained instance having the best performance relative to the cumulative reward.

At block 514, the system uses at least the selected actor network (selected at block 512), with the best hyperparameters (selected in method 400), in performing a robotic task—optionally after further reinforcement learning training of the at selected actor network.

Figure 6:
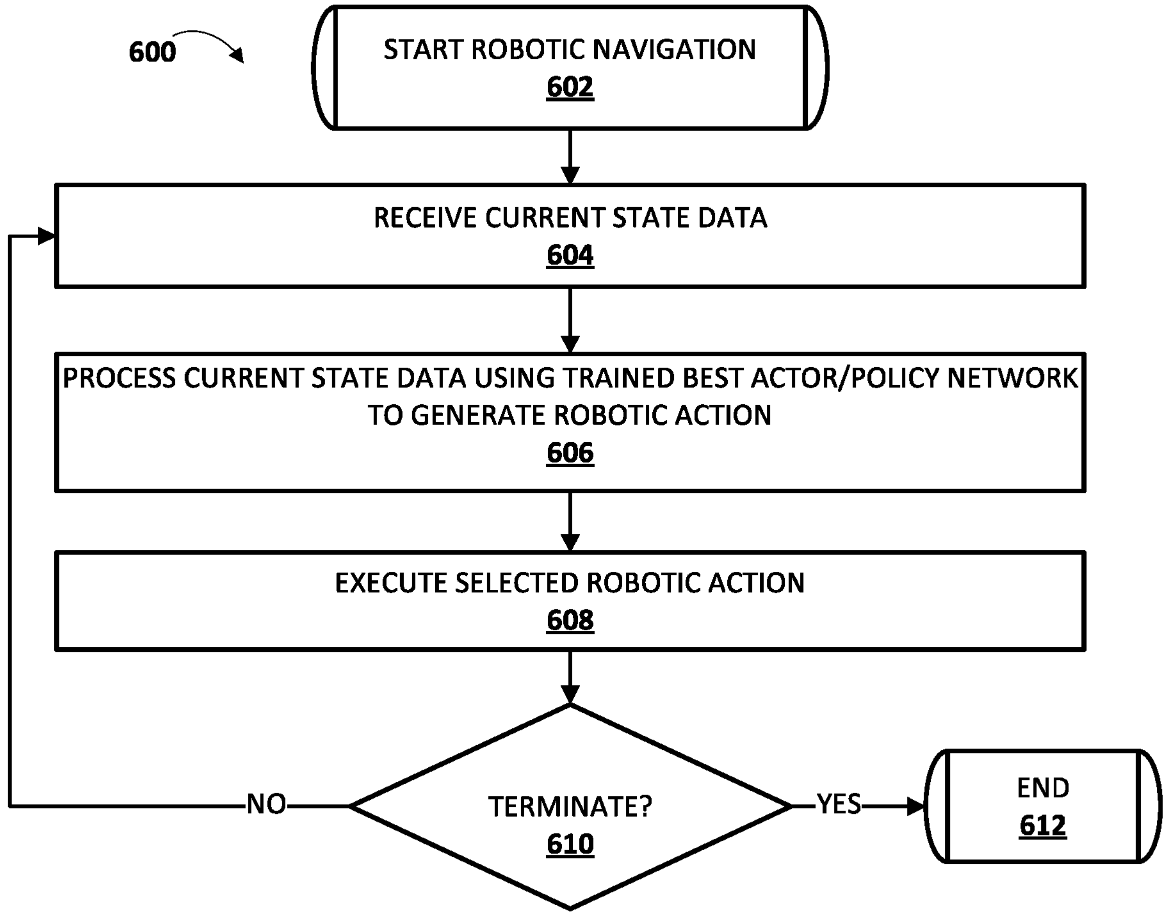
FIG. 6 is a flowchart illustrating an example method of performing a robotic task using a trained policy network.

FIG. 6 is a flowchart illustrating an example method of performing a robotic task using a trained policy network. For convenience, the operations of the flow chart are described with reference to a system that performs the operations. This system may include one or more components of one or more computer systems, such as one or more processors of a robot. Moreover, while operations of method 600 are shown in a particular order, this is not meant to be limiting. One or more operations may be reordered, omitted or added.

At block 602, the system starts robotic navigation.

At block 604, the system receives current state data of a robot. The current state data can include, for example current vision data from vision sensor(s) of the robot, current pose data indicated the current pose of component(s) of the robot, and/or other current state data.

At block 606, the system processes the current state data using a trained best actor/policy network, to generate a robotic action to implement. For example, the utilized trained best actor/policy network can be one having hyperparameters selected based on method 500, and being trained with reward weights selected based on method 400.

At bock 608, the system executes the selected robotic action. At block 610, the system determines whether to terminate the robotic navigation task. If so, the system proceeds to block 612 and the current instance of robotic navigation ends (although additional instances can be performed). If not, the system proceeds back to block 604, receives new current state data, then performs another iteration of blocks 606, and 608 based on the new state data. In some implementations and/or situations, the system can terminate the performance of the robotic task if the system determines the executed task objective is completed. In some implementations and/or situations, the system can terminate the performance of the robotic task if a critic network, corresponding to the best actor network, processes the stat data and the executed task objective is completed. In some implementations and/or situations, the system can terminate the performance of the robotic task if the action at a most recent iteration of block 606 indicated termination. In some additional or alternative implementations and/or situations, the system can terminate the episode if a threshold quantity of iterations of blocks 604, 606, and 608 have been performed for the performance and/or if other heuristics based termination conditions have been satisfied.

Although various examples provided herein are in the context of a robotic navigation task, it is understood that similar techniques can be utilized for additional and/or alternative robotic task(s) such as grasping object(s), placing object(s), and/or other object manipulation task(s). Further, techniques described herein can optionally be utilized in determining reward weights and network hyperparameters for reinforcement learning in non-robotic context(s).

Figure 7:
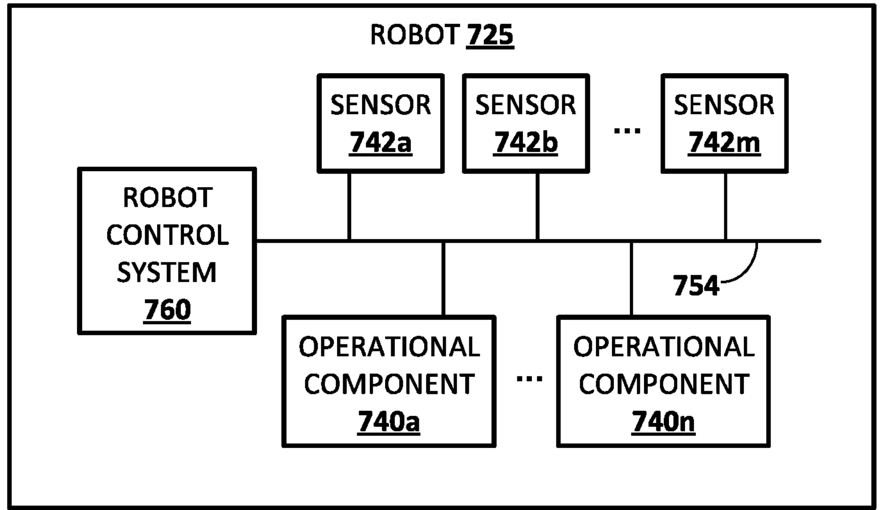
FIG. 7 schematically depicts an example architecture of a robot.

FIG. 7 schematically depicts an example architecture of a robot 725. The robot 725 includes a robot control system 760, one or more operational components 740*a*-740*n*, and one or more sensors 742*a*-742*m*. The sensors 742*a*-742*m* may include, for example, vision sensors, light sensors, pressure sensors, pressure wave sensors (e.g., microphones), proximity sensors, accelerometers, gyroscopes, thermometers, barometers, and so forth. While sensors 742*a*-742*m* are depicted as being integral with robot 725, this is not meant to be limiting. In some implementations, sensors 742*a*-742*m* may be located external to robot 725, e.g., as standalone units.

Operational components 740*a*-740*n* may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740*a*-740*n*, with each of the real time bursts comprising a set of one or more control commands that dictate, inter alia, the parameters of motion (if any) for each of one or more of the operational components 740*a*-740*n*. In some implementations, the robot control system 760 may perform one or more aspects of method 600 described herein in performing a robotic navigation task and/or other robotic task.

As described herein, in some implementations all or aspects of the control commands generated by control system 760 in performing a robotic task can be based on an action selected based on a current state (e.g., based at least on current vision data) and based on utilization of a trained policy network as described herein. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
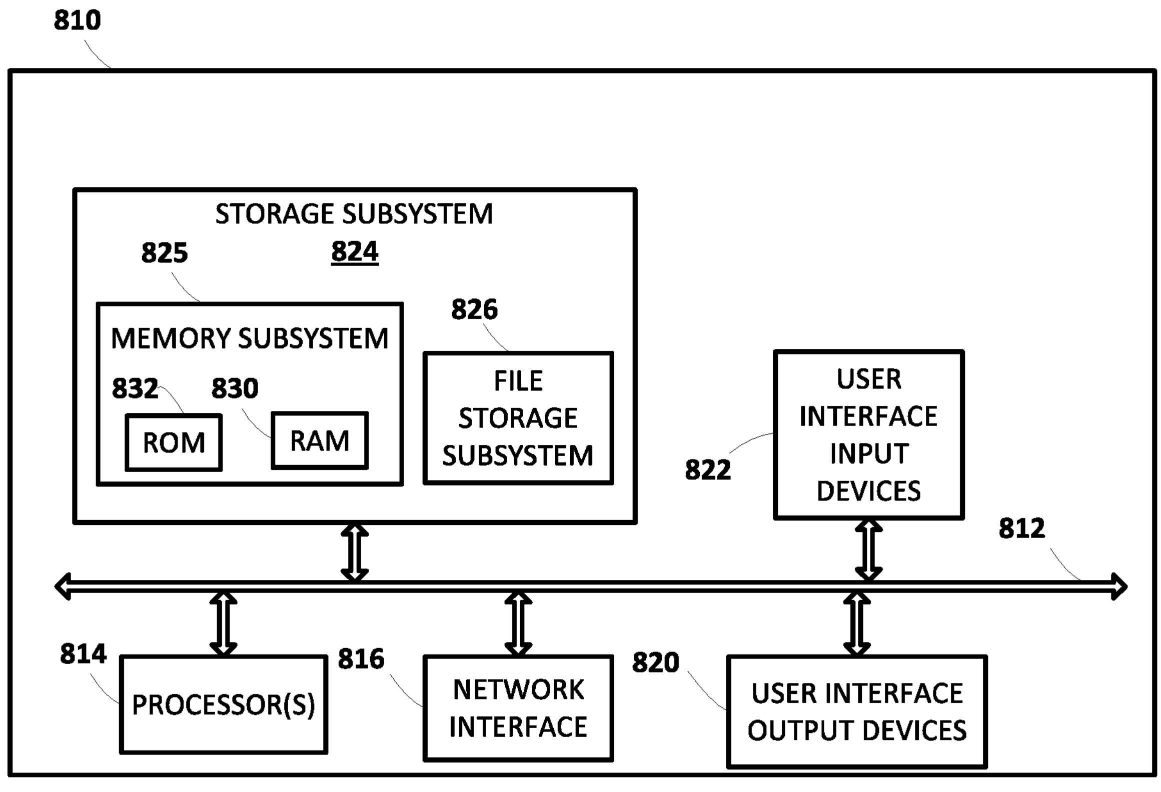
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more method described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

What is claimed is:

1. A method of generating, via reinforcement learning, a trained policy network, the method implemented by one or more processors, and the method comprising:

determining a given set of reward weights to use in generating parameterized atomic rewards to be processed by a critic network during training of the trained policy network, determining the given set of reward weights comprising:

selecting a given actor network and a given critic network;

selecting a plurality of sets of reward weights, including the given set of reward weights;

performing a plurality of reward-shaping reinforcement learning trials, each using a respective instance of the given actor network and the given critic network, and using a respective one of the sets of reward weights, wherein performing each of the reward-shaping reinforcement learning trials comprises:

training the respective instance of the given actor network and the given critic network using reinforcement learning based on training episodes, including using the respective one of the sets of reward weights in generating respective parameterized atomic rewards to be processed by the respective instance of the given critic network during the training; and evaluating, after the training, each of the respective instances of the given actor network to generate a respective evaluation metric; and selecting the given set of reward weights, from the plurality of sets of reward weights, based on the respective evaluation metric for the respective instance of the given actor network, trained using the given set of reward weights;

selecting a given actor network and critic network pair, affer selecting the given set of reward weights, selecting the given actor network and critic network pair comprising:

generating a plurality of actor network and critic network pairs, each of the actor network and critic network pairs having unique hyperparameters;

performing a plurality of network-shaping reinforcement learning trials, each using the selected given set of reward weights, and using a respective pair of the actor network and critic network pairs, wherein using the selected given set of reward weights is responsive to selecting the given set of reward weights;

evaluating, after the network-shaping reinforcement learning trials, the actor network of each of the actor network and critic network pairs, to generate a respective additional evaluation metric, the actor network and critic network pairs, for which the respective additional evaluation metric is generated, including a first pair having first hyperparameters and a second pair having second hyperparameters; and selecting the given actor network and critic network pair, from the actor network and critic network pairs, based on the respective additional evaluation metric for the actor network of the given actor network and critic network pair; and in response to selecting the given actor network and critic network pair, using the selected given actor network and critic network pair and the selected given set of reward weights in generating the trained policy network, wherein the trained policy network comprises the actor network, of the selected given actor network and critic network pair, after reinforcement learning based on the selected given set of reward weights.

2. The method of claim 1, wherein the evaluation metrics each indicate performance of a respective one of the instances of the given actor network with respect to only a task objective reward for a robot navigation task.

3. The method of claim 2, wherein the robot navigation task is one of a point to point navigation task and a path following navigation task.

4. The method of claim 2, wherein the additional evaluation metrics each indicate performance of a respective actor network, of the actor network and critic network pairs, with respect to a cumulative reward that is a function of the task objective reward and one or more additional rewards.

5. The method of claim 1, wherein the hyperparameters comprise widths for one or more hidden layers of the actor network and critic network pairs.

6. The method of claim 5, wherein the hyperparameters consist of widths for one or more hidden layers of the actor network and critic network pairs.

7. The method of claim 6, wherein the hidden layers are feed-forward layers.

8. The method of claim 1, wherein the given set of reward weights comprises a first reward weight for a first reward component that indicates whether a goal location has been reached, and a second reward weight for a second reward component that indicates a distance to the goal location or a distance to an un-reached waypoint.

9. The method of claim 8, wherein the given set of reward weights further comprise a third reward weight for a third reward component that indicates whether a collision with an obstacle is occurring.

10. The method of claim 1, wherein selecting the plurality of sets of reward weights comprises selecting an initial subset of the sets of reward weights, and selecting an additional subset of the initial subset after performing an initial subset of the reward-shaping reinforcement learning trials using the initial subset of the sets of reward weights.

11. The method of claim 10, wherein selecting the initial subset of the sets of reward weights comprises randomly selecting the initial subset, and wherein selecting the additional subset comprises selecting the additional subset based on an optimization performed after performing the initial subset of the reward-shaping reinforcement learning trials using the initial subset of the sets of reward weights.

12. The method of claim 1, wherein selecting the actor network and critic network pairs comprises selecting an initial subset of the actor network and critic network pairs, and selecting an additional subset of the actor network and critic network pairs after performing an initial subset of the network-shaping reinforcement learning trials using the initial subset of the actor network and critic network pairs.

13. The method of claim 12, wherein selecting the initial subset of the actor network and critic network pairs comprises randomly selecting the hyperparameters for the initial subset, and wherein selecting the additional subset comprises selecting the additional subset based on an optimization performed after performing the initial subset of the network-shaping reinforcement learning trials using the initial subset of the actor network and critic network pairs.

14. The method claim 1, wherein the reinforcement learning is Deep Deterministic Policy Gradient (DDPG) reinforcement learning.

15. The method of claim 1, wherein the training episodes are robot navigation episodes, and wherein the robot navigation episodes optionally include simulated robot navigation episodes.

16. The method of claim 1, wherein the actor networks and the critic networks process, during the reinforcement learning, state data that includes robot vision sensor data.

17. The method of claim 16, wherein the robot vision sensor data comprises one-dimensional depth data.

18. The method of claim 17, wherein the one-dimensional depth data is real or simulated LIDAR data.

19. The method of claim 16, wherein the state data further comprises a current robot pose and/or a goal pose.

20. A method of generating, via reinforcement learning, a trained policy network, the method implemented by one or more processors, and the method comprising:

performing multiple instances of reinforcement learning on each of a plurality of separate instances of the same actor and critic network, each of the multiple instances of reinforcement learning utilizing a separate set of reward weights to be processed by the critic network during the reinforcement learning;

selecting, from the sets of reward weights, a single set of reward weights to use as fixed reward weights for the trained policy network, wherein selecting the single set of reward weights is based on evaluation of the separate instances of the same actor and critic network;

in response to selecting the single set of reward weights, using the single set of reward weights in performing reinforcement learning on each of a plurality of separate actor and critic network pairs, each of the actor and critic network pairs having neural network architectures that are distinct from other neural network architectures of other actor and critic network pairs;

selecting, from the actor and critic network pairs and based on a respective evaluation metric for each of the actor and critic network pairs, a single actor and critic network pair;

using the single actor and critic network pair and the selected single set of reward weights in performing further reinforcement learning to train the actor network of the single actor and critic network pair; and after performing the reinforcement learning, using the trained actor network as the trained policy network.

* * * * *